F. S. DICKINSON.
PNEUMATIC TIRE.
APPLICATION FILED OCT. 11, 1912.
1,115,514.
Patented Nov. 3, 1914.
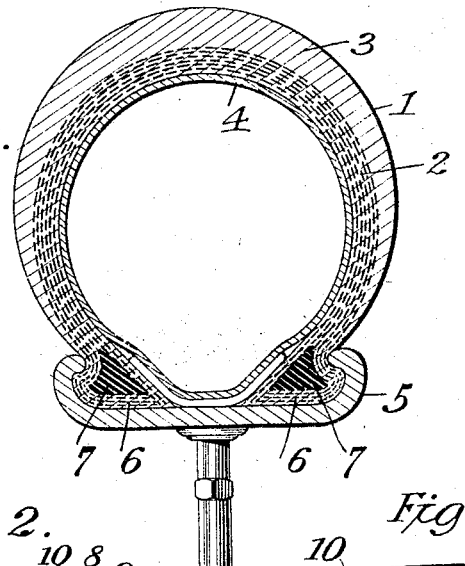
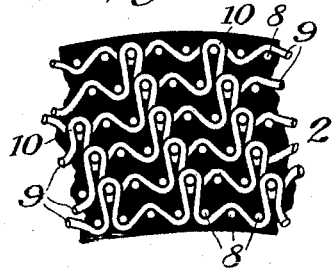
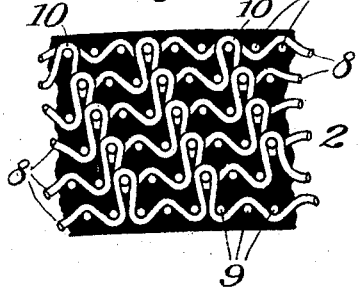
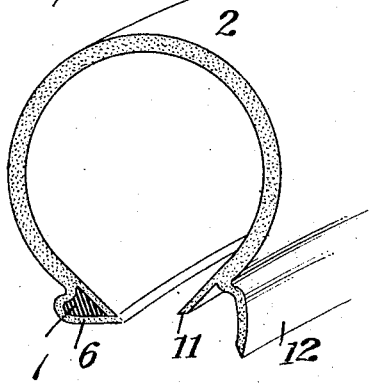
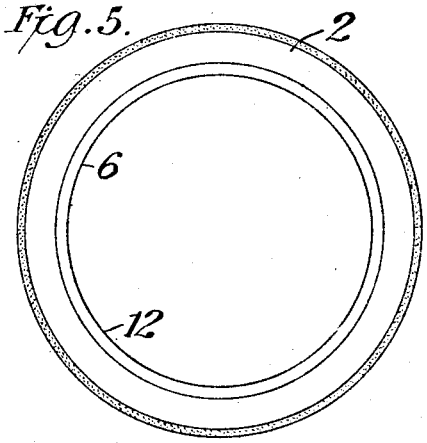
Witnesses:
A. R. Appleman
Madeline Roenlicht
Inventor
Frederick S. Dickinson,
By his Attorney

UNITED STATES PATENT OFFICE.

FREDERICK S. DICKINSON, OF NEW YORK, N. Y.

PNEUMATIC TIRE.

1,115,514.

Specification of Letters Patent. Patented Nov. 3, 1914.

Application filed October 11, 1912. Serial No. 725,245.

*To all whom it may concern:*

Be it known that I, FREDERICK S. DICKINSON, a citizen of the United States, and resident of New York, in the county and State of New York, have invented certain new and useful Improvements in Pneumatic Tires, of which the following is a specification.

This invention relates to pneumatic tires such as are now commonly used upon automobiles and other vehicles, and my improvements have particular relation to the elastic shoe or casing which constitutes the outer portion and tread of the tire and incloses the inner air tube. Such shoes or casings comprise a body constituted by layers of textile fabric held in cohesion by caoutchouc or rubber and carrying an external portion constituting the tread. The fabric body has heretofore been built up from a plurality of separate layers or plies of textile fabric, to produce the required thickness, each layer being made up of separate strips spliced together at lap joints. Fabric adapted for the purpose is woven with warp and woof threads in straight lines, and owing to its limitations in standard width it is cut on the bias to produce the required length of strips which are lapped and spliced together at their ends to form the individual layers or plies from which the body fabric of the tire casing is built up. The separate fabric layers thus formed are built up in laminated or superposed order to produce the desired body thickness of fabric.

The employment of lapped and spliced joints in the fabric layers, and the employment of separate layers of fabric, in the tire casings as now generally constructed, is open to many disadvantages. The construction is expensive and requires much time and labor, and the lapped joints produce a point of extreme weakness at which "blow-outs" usually occur, this being due to the excess thickness and strength at such joint-lap, which prevents the uniform absorption of the "shuffling" action of the separate strands throughout the entire body of the fabric under the elastic action of the tire when in use and abruptly checks the same at the line of such joint, thus causing a "sawing" action between the strands and resulting in a break at the line of the joint.

A further difficulty is encountered in uniting the separate superposed layers or plies of fabric at all points over their respective surfaces. In the prior construction, as above set forth, cohesion in the body fabric built up of the separate layers is secured by caoutchouc or rubber applied between the layers, and this is accomplished by pressing the rubber upon the surface of the fabric layer as it is passed through calender rolls. The great pressure necessarily applied in the rolls tends to flatten out the threads or strands of the closely-woven fabric, thus closing the open mesh and precluding the entrance of the rubber within the mesh. It is desirable to impregnate the mesh of the fabric with the friction rubber, but the mere skin coating resulting from the application of the rubber by calender rolls does not penetrate the pores or mesh of the fabric and forms only a cohesive bond between the surfaces of the separate layers of fabric. Consequently, the threads or strands of the respective layers of fabric are subject to a "sawing" movement under the elastic action of the tire, which materially reduces durability. Furthermore, the requisite high compression upon the fabric in the calender rolls fractures or impairs the overlapping threads or strands, thus initially causing points of weakness and a high percentage of loss in the effective service or life of the tire.

In the prior construction, requiring the building up of the fabric body of the tire casing from separate layers of fabric, the fabric must be stretched or distorted to produce the required curvatures in the shape or contour of the segmental cross-section and annular or ring form of the complete shoe or casing, and this stretching or distortion further weakens any distended threads or strands and produces inequalities under which the non-uniformity in the torsional status and structural condition of the different strands, some being distended and others highly compressed, permits of a greater degree of "shuffling" movement of the strands and a tendency to work upon each other with a "sawing" action when the tire is in use, which action of the strands is transmitted from layer to layer and ultimately causes a break through the entire body fabric, this being another frequent cause of "blow-outs." Furthermore, in the employment of separate layers of superposed or laminated fabric, uniformity of torsion does not exist throughout the body fabric, as the torsional strength will vary in the different layers, and thus air pockets are produced and establish an area at which there is no bond between the separate layers. These air pockets cause wrinkles forming ridges bearing against the next layer and result in the gradual separation of the different layers and a consequent material reduction in durability.

It is the object of my present improvements to overcome all of the conditions and disadvantages above set forth, and to provide a simple and improved shoe or casing which can be more readily and economically manufactured and which will possess maximum advantages in point of uniformity throughout the body fabric, strength, durability, and general efficiency.

To these ends, my invention comprises an improved tire in which the body fabric has its layers or plies interwoven or directly connected in a unitary endless fabric conforming to the shape or contour of the annular and segmental cross-section body, and my improvements also comprise a body fabric of this character having caoutchouc or rubber impregnating the entire unitary fabric between each ply and between all the threads or strands and in all the spaces of the fabric mesh, substantially as hereinafter described and particularly pointed out in the claims.

In the drawings—Figure 1 is a cross-section through a pneumatic tire of a type to which my improvements relate. Fig. 2 is a detail section, on an enlarged or magnified scale, on a plane transverse of the body fabric. Fig. 3 is a detail section corresponding to Fig. 2, on a plane longitudinal of the body fabric. Fig. 4 is an outline view, showing a transverse cross-section of the body fabric and a part of the longitudinal extent thereof in perspective, as said fabric is finished and ready for assembling in the tire construction. Fig. 5 is an outline view illustrating a longitudinal section of the body fabric as completed in annular or ring form and ready for assembling in tire construction.

Corresponding parts in all the figures are denoted by the same reference characters.

Referring to the drawings, 1 designates the tire shoe or casing, which comprises the fabric body, 2, and elastic external portion constituting the tread, 3, which casing incloses the inner air tube, 4, and is held in connection with the wheel rim, 5. I have herein illustrated a "clencher" tire, which is one of the types to which my improvements are adapted, and in this type the casing has the terminal edge or base portions, 6, of its segmental cross-sectional contour clenched within the edge flanges of the rim 5, said portions 6 conforming to the internal contour of the rim 5 and being for this purpose enlarged by separation of the layers or plies of the body fabric to form a pocket within which is inclosed a continuous strip of hard rubber, as at 7.

The improved body fabric 2, as comprised in my invention, is a unitary endless fabric conforming to the annular and segmental cross-section shape or contour of the shoe or casing and having a plurality of superposed layers or plies which are interwoven or directly connected together. I have herein illustrated one preferred form or construction of such unitary multiple-ply body fabric, in which each layer or ply is composed of interwoven warp and woof threads or strands, 8 and 9, such strands of the respective layers or plies being at different points or intervals interwoven with the threads or strands of the next adjoining layer or ply, as at 10, whereby all the layers or plies are connected in a homogeneous unitary body fabric. But it will be understood that the unitary multiple-ply body fabric may be formed in any other adapted weave or manner; for instance, with a supplementary weave connecting the respective layers or plies, or by tying the threads or strands of adjoining plies together, or by any textile construction in which the respective layers or plies are directly connected in a unitary endless body fabric. Preferably, in the organization of the unitary multiple-ply body fabric, the warp and woof threads extend in straight lines transversely and longitudinally of the tire casing, as herein shown, which condition affords greater strength than when the threads extend on the bias as in the constructions heretofore employed in which the layers or plies of the body fabric are pieced from strips cut on the bias from a piece of straight-woven fabric.

The improved body fabric, having the characteristics above described, affords uniform conditions and a uniform torsional status throughout the entire unitary fabric and obviates all the disadvantages and loss of effective service which result from the pieced separate-layer construction heretofore employed, as hereinbefore set forth, and the improved unitary body fabric is adapted for effective impregnation as a whole or unit with caoutchouc or rubber without subjection to high pressures to apply cohesive skin coatings, as in calender rolls, and thus precludes stretching or distortion of any of the threads or strands. The obviation of the application of high pressure, as heretofore required, also enables the thorough impregnation of the improved unitary multiple-ply body fabric with caoutchouc or rubber at all points within the mesh of the respective connected layers or plies and between the threads or strands thereof as well as at all points between the layers or plies, as illustrated in Figs. 2 and 3, thus producing a uniform homogeneous body combining the textile layers or plies and the caoutchouc filling.

The homogeneous impregnation of all parts of the improved body fabric 2, to thoroughly combine the textile and caoutchouc filler, is adapted, by reason of the unitary construction of the multiple-ply fabric, to be readily effected by any of the well-known vacuum processes, which exclude all air and dry out all moisture, and in this preferred employment of the vacuum process of impregnation it is simply necessary to subject the complete unitary tire-casing body fabric to the application of the caoutchouc filler in vacuum, whereby a thorough and effective cohesion of the respective connected layers or plies and of each thread or strand of the unitary fabric is secured without the distortion or stretching or deterioration of the fabric such as necessarily results from the application of high pressures. But it will be understood that the impregnation of the improved unitary body fabric, as comprised in my improvements, may be effected in any suitable or adapted manner, to thoroughly combine the textile and caoutchouc filler to produce the homogeneous tire-casing body fabric. For instance, the threads or strands may be saturated with caoutchouc or rubber before being woven into the unitary multiple-ply body fabrics, and under the vulcanization to which such body fabrics thereafter are subjected the heat of the vulcanizing process will cause the caoutchouc carried by the woven threads or strands to mold into all parts of the mesh of the respective plies, and between the strands and between the plies and thus produce the homogeneous textile and caoutchouc body. It will be understood, in this connection, that under the high pressure calendar rolls application of the rubber to separate layers or plies of body fabric, as hereinbefore set forth, air and moisture are not thoroughly excluded, and therefore in the subsequent process of vulcanizing under high heat the air or moisture in the fabric body forms pockets and thus precludes proper cohesion between the layers or plies and rubber at all surface points, whereas the adaptability of the improved unitary multiple-ply body fabric, as in my invention, to a vacuum process of impregnation, thoroughly eliminates the presence of air or moisture at any point in the homogeneous body prior to the process of vulcanization.

The general details of construction of the unitary body fabric may be varied as desired with reference to the type of tire to which the improvements are applied. If a "clencher" type of shoe or casing is employed, as herein illustrated, the base edge portions 6 of the unitary endless body fabric are interwoven with the main segmental cross-section body, in like manner and preferably with a lesser number of connected layers or plies, to form the continuous inner wall or extension, as at 11, of the base socket, and to form a continuous flap or extension, as at 12, which is adapted to be folded inwardly, after the rubber core 7 has been seated in position between the wall or extension 11 and said flap or extension 12, to form the bottom wall of the base socket, and have its terminal edge connected in the usual manner with the edge of the wall or extension 11, as illustrated in Figs. 4 and 5.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claim.

Having thus described my invention, I claim and desire to secure by Letters Patent:

As a new article of manufacture, an internal textile body fabric or carcass unit, for the shoe or casing of pneumatic tires, having its body woven initially in the normal contour of an endless annular and segmental cross-section ring conforming to the contour of the elastic body of the shoe or casing within which it is to be embedded, and with all its threads or strands initially in normal relationship to said body contour, and constituting a homogeneous textile unit in normal condition for placement in association with the elastic body of the shoe or casing without distortion of any part of its initial woven normal body contour and without stretching or distortion of any of its threads or strands.

In witness whereof I have signed my name in the presence of the subscribing witnesses.

FREDERICK S. DICKINSON.

Witnesses:
ARTHUR B. KELLY,
JOS. REED LITTELL.